United States Patent
Sim et al.

(10) Patent No.: US 9,681,649 B2
(45) Date of Patent: Jun. 20, 2017

(54) FISHING REEL

(71) Applicant: COCUS CO., LTD., Bucheon-si, Gyeonggi-do (KR)

(72) Inventors: Eun Ki Sim, Incheon (KR); Jung Hyun Nam, Incheon (KR)

(73) Assignee: COCUS CO., LTD., Bucheon-si (KR)

( * ) Notice: Subject to any disclaimer, the term of this patent is extended or adjusted under 35 U.S.C. 154(b) by 0 days.

(21) Appl. No.: 15/134,108

(22) Filed: Apr. 20, 2016

(65) Prior Publication Data

US 2017/0142949 A1 May 25, 2017

(30) Foreign Application Priority Data

Nov. 23, 2015 (KR) ........................ 10-2015-0164207

(51) Int. Cl.
*A01K 89/01* (2006.01)
*A01K 89/0155* (2006.01)

(52) U.S. Cl.
CPC .............................. *A01K 89/01557* (2015.05)

(58) Field of Classification Search
CPC ............ A01K 89/015; A01K 89/01557; A01K 89/0155
USPC .......................................................... 242/289
See application file for complete search history.

(56) References Cited

U.S. PATENT DOCUMENTS

| | | | | |
|---|---|---|---|---|
| 4,390,140 A * | 6/1983 | Karlsson | ............ | A01K 89/0155 188/185 |
| 5,542,619 A * | 8/1996 | Karlsson | ............ | A01K 89/0155 188/184 |
| 5,865,387 A * | 2/1999 | Hirano | ............... | A01K 89/0155 188/181 A |
| 5,984,221 A | 11/1999 | Kim | | |
| 6,003,798 A | 12/1999 | Kim | | |
| 6,126,105 A * | 10/2000 | Yamaguchi | ........ | A01K 89/0155 188/164 |
| 6,168,106 B1 * | 1/2001 | Cockerham | ........ | A01K 89/0155 188/185 |
| 6,254,021 B1 * | 7/2001 | Morimoto | .......... | A01K 89/0155 188/181 A |
| 6,293,483 B1 * | 9/2001 | Sato | ................... | A01K 89/0155 242/289 |

(Continued)

FOREIGN PATENT DOCUMENTS

| KR | 10-0969227 B1 | 7/2010 |
|---|---|---|
| KR | 10-2015-0000817 A | 1/2015 |
| KR | 10-1510728 B1 | 4/2015 |

*Primary Examiner* — Emmanuel M Marcelo

(74) *Attorney, Agent, or Firm* — Morgan, Lewis & Bockius LLP

(57) ABSTRACT

A fishing reel is provided, which includes: a frame having a through hole and a mounting part; a spool rotatably disposed inside of the frame with a fishing line wound thereon; a main shaft inserted into the spool; a brake unit mounted on the spool to put the brake thereon; and a cover unit disposed on the brake unit. The brake unit includes: a retainer having a fixing groove and a plurality of first guide grooves; a brake shoe housing fixed to the retainer and has a plurality of slots, a plurality of second guide grooves, and a plurality of mounting grooves; brake shoes mounted in the plurality of slots so as to be inserted into the slots or withdrawn therefrom; and pivot members mounted in the mounting grooves to press the brake shoes.

9 Claims, 5 Drawing Sheets

(56) References Cited

U.S. PATENT DOCUMENTS

| | | | |
|---|---|---|---|
| 6,957,787 B1* | 10/2005 | Rho | A01K 89/0155 188/181 A |
| 7,938,353 B2 | 5/2011 | Koh | |
| 9,101,120 B2 | 8/2015 | Hyun | |
| 2004/0050990 A1* | 3/2004 | Seo | A01K 89/0155 242/289 |
| 2010/0001112 A1* | 1/2010 | Noh | A01K 89/0155 242/289 |
| 2011/0073697 A1* | 3/2011 | Koh | A01K 89/0155 242/288 |
| 2014/0263793 A1* | 9/2014 | Niitsuma | A01K 89/0155 242/289 |
| 2014/0332616 A1* | 11/2014 | Niitsuma | A01K 89/0155 242/289 |
| 2014/0374524 A1* | 12/2014 | Takechi | A01K 89/0155 242/289 |

* cited by examiner

BRAKE SHOE NON-OPERATING (OFF) STATE

BRAKE SHOE OPERATING (ON) STATE

FISHING REEL

CROSS-REFERENCE TO RELATED APPLICATIONS

This application claims priority to Korean Patent Application No. 10-2015-0164207, filed on Nov. 23, 2015 in the Korean Intellectual Property Office, the entire disclosure of which is incorporated herein by reference.

BACKGROUND OF THE INVENTION

Field of the Invention

The present invention relates to a fishing reel, and more particularly, to a fishing reel capable of improving a braking force of a braking unit.

Description of the Related Art

Generally, in order to alleviate a problem of a line backlash (also referred to as 'line nesting') which is a phenomenon that a fishing line gets entangled due to excessive rotation of a spool, a spool drag of a fishing reel is commonly used in a bait casting reel.

The spool drag or a spool brake system uses the spool which is oriented in a lateral direction and rotates while throwing the fishing line, such that the bait casting reel is more likely to result in a backlash than a spinning reel and a spin-casting reel.

Such a problem mainly occurs due to a rotational momentum generated by the spool.

A variety of brake systems have been developed in order to reduce the problem of backlash. Such brake systems mainly used in the art include a magnet brake system or a centrifugal brake system.

Unlike the magnet brake system, the centrifugal brake system has an advantage in that as a rotation speed of the spool is increased, a braking force exerted by the centrifugal brake system is increased.

As an example of such a conventional centrifugal brake system, a brake system of a fishing reel has been filed and issued by the applicant in Korean Patent Registration No. 10-0969227, which will be briefly described below.

The conventional brake system of a fishing reel includes: a frame having a right plate and a left plate; a spool which is rotatably mounted on the frame between the right and left plates and has a fishing line wound thereon; a main shaft which penetrates the spool to longitudinally extend; a level winding mechanism which moves across the spool during winding so that the fishing line is uniformly wound over the entire length of the spool; a right cover fixed to an outer surface of the right plate; a handle which operatively extends from the right cover and serves to rotate the spool; a reel foot which is formed on a bottom of the frame so as to attach the fishing reel to a fishing rod; a left cover fixed to the left plate; a spool cover which is disposed between the spool and the left cover, and includes a cylindrical inner wall, first brake collars or magnetic brake devices formed on the inner wall, circular protrusions formed in a central part thereof, and second brake collars formed on the protrusions; and a brake assembly which is disposed between the spool and the spool cover and allows the second brake collar to perform a brake operation when a fishing weight or a fishing needle attached to an end of the thrown fishing line passes through a peak point to decrease a rotation force of the spool, so as to put the brake on the spool, wherein the brake assembly includes a brake housing coupled to the main shaft so as to come in close contact with the spool, a housing cover coupled to the brake housing, brake shoes coupled to the brake housing, and coil springs provided between the brake housing and the spool cover so as to elastically support the brake shoes, and the brake housing includes a plurality of outer coupling units formed on an upper surface thereof at a constant interval so that the brake shoes are inserted outward, and a plurality of inner coupling units formed between each of the outer coupling units so that the brake shoes are inserted inward, wherein the inner coupling unit includes insertion parts into which the coil springs are inserted, and a plurality of locking grooves formed on an outer circumference thereof.

In the conventional brake system of a fishing reel having the above-described configuration, since the brake shoes for putting the brake on the inner wall of the spool cover and the protrusions are respectively operated, a large number of components are required, and thereby the structure thereof is complicated and a lot of time and labor are consumed to assemble the same.

In particular, the brake shoe for putting the brake on the inner wall of the spool cover is operated by a centrifugal force of the spool. In this case, the brake shoe directly receives the centrifugal force of the spool, and thereby, in this structure, a braking force of the brake shoe is significantly decreased.

In addition, U.S. Pat. Nos. 5,984,221 and 6,003,798, Korean Patent Laid-Open Publication No. 10-2015-000817, Korean Patent Registration No. 10-1510728, and the like disclose the brake system of a fishing reel using the brake shoes. However, such the techniques also have a poor braking force, or are inconvenient for use due to a complicated structure.

SUMMARY OF THE INVENTION

Accordingly, in consideration of the above-described problems, it is an object of the present invention to provide a fishing reel which includes pivot members provided in brake shoes for putting the brake on a brake disc so as to strongly push out the brake shoes by interacting with the brake shoes with a small force, and thereby a centrifugal force of a spool may be easily received to improve a braking force of the brake shoes.

According to an embodiment of the present invention, there is provided a fishing reel including: a frame having a through hole formed on a front part thereof, and a mounting part formed on a surface opposite to the through hole by protruding therefrom to receive a bearing therein; a spool which is rotatably disposed inside of the frame and has a fishing line wound thereon; a main shaft which penetrates and is inserted into the spool, while one end thereof is mounted in the mounting part through the bearing; a brake unit mounted on a front part of the spool to put the brake thereon; and a cover unit disposed on a front part of the brake unit so as to form an appearance of the brake unit, wherein the brake unit includes: a retainer having a fixing groove formed in a rear part thereof to be engaged with a protrusion formed on the front part of the spool, and a plurality of first guide grooves radially formed in an edge portion thereof; a brake shoe housing which is fixed to the retainer, and has a plurality of slots formed in a rear part thereof so as to correspond to the first guide grooves, a plurality of second guide grooves formed by extending toward a central part of the brake shoe housing, and a plurality of mounting grooves radially formed on an edge portion thereof so as to correspond to the respective slots; brake shoes which are mounted in the plurality of slots so as to be inserted into the slots or withdrawn therefrom; and pivot members which are mounted in the mounting grooves to press the brake shoes or not to press the same.

Herein, the cover unit may include: a brake disc which is disposed so as to be overlapped on the front part of the brake shoe housing, and has a lower part protruding therefrom so as to be grasped by the brake shoe or released by the same; a brake drum which is disposed outside of the brake disc to be coupled thereto so as to form an appearance of the brake disc; an adjustment unit which is mounted in the brake drum to move the brake drum in a front-back direction; and a frame cover which has a hole formed in a central part thereof so that the adjustment unit is exposed to an outside while being disposed outside of the adjustment unit, and is coupled to the frame, so as to prevent the brake unit and the spool from being detached from inside of the frame.

In addition, the adjustment unit may include: a pressing member mounted on a front part of the brake drum so as to press the brake drum in the front-back direction; a rotating cap rotatably assembled to the pressing member so as to move the brake drum by the pressing member in the front-back direction during rotation thereof; and a knob which is engaged to a central part of the rotating cap to rotate the rotating cap by applying a rotation force thereto.

Further, the pivot members may be pivoted in a radial direction of the spool by a centrifugal force which is generated and applied thereto, when the spool rotates.

Further, the pivot member may include a pivot axis which is formed at a lower part thereof and is rotatably mounted on the mounting groove, and the pivot member is formed such that an upper part thereof has a larger weight than the lower part thereof, based on the pivot axis.

Further, the pivot axis may be integrally formed with the lower part of the pivot member or may be separately formed therefrom.

Furthermore, pivot member may be configured so that, when the spool rotates, a centripetal force is applied to the lower part thereof as much as a force corresponding to the centrifugal force applied to the upper part thereof, and the centripetal force applied to the lower part thereof is larger than the centrifugal force applied to the brake shoe.

Furthermore, the brake disc may have a lower part formed in a taper shape.

Furthermore, each of the pivoting members may be selectively locked or unlocked to the brake shoe housing.

The fishing reel according to the embodiments of the present invention has the pivot members for receiving the centrifugal force generated by the rotation of the spool, and the pivot members press the brake shoes while being pivoted, such that the brake shoes may be smoothly operated.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
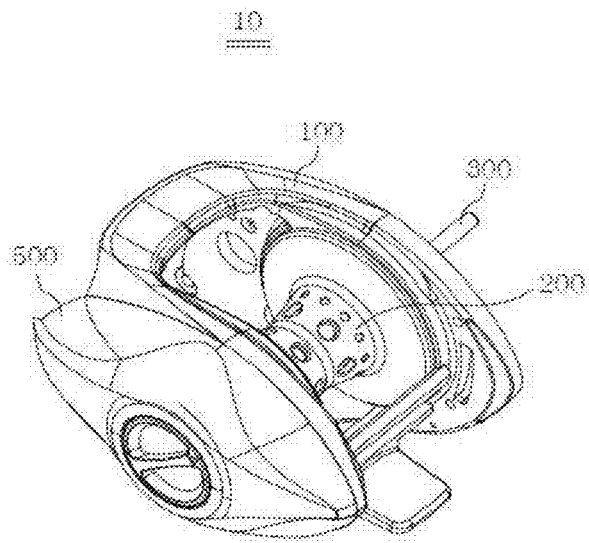
FIG. 1 is a perspective view of a fishing reel according to one embodiment of the present invention.

Hereinafter, preferred embodiments of the present invention will be described in detail with reference to the accompanying drawings, so as to assist those having ordinary skill in the art in a comprehensive understanding of the invention, and the present invention is not limited to the embodiments disclosed below. Rather, these exemplary embodiments are provided so that this disclosure is thorough, and will fully convey the scope of the invention to those skilled in the art. In the embodiments of the present invention, the publicly known functions and configurations that are judged to be able to make the purport of the present invention unnecessarily obscure will not be described. For the convenience of explanation, the size of each component may be exaggerated in the drawings.

Figure 2:
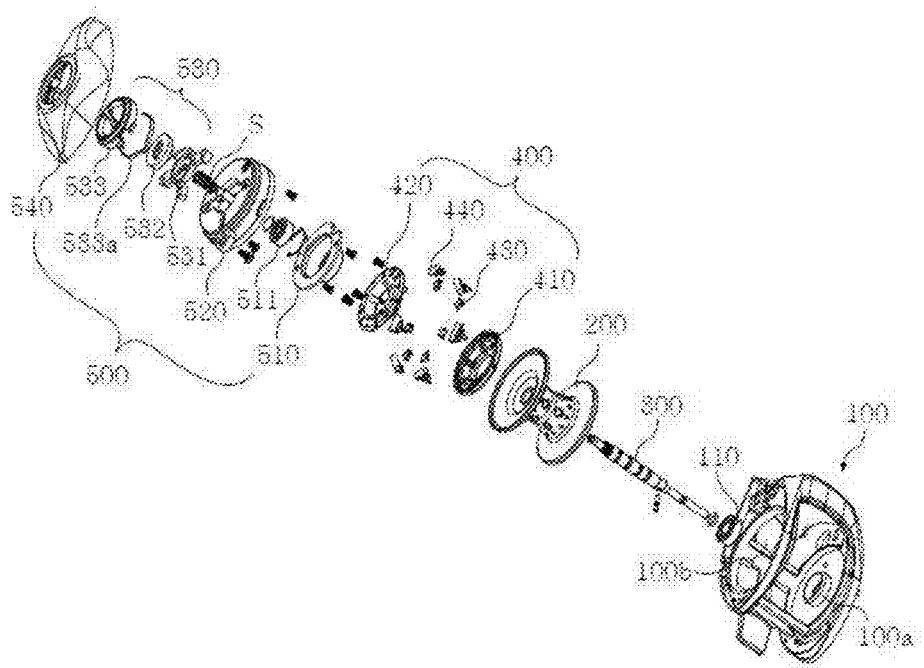
FIG. 2 is an exploded perspective view of the fishing reel according to one embodiment of the present invention.

FIG. 1 is a perspective view of a fishing reel according to one embodiment of the present invention, and FIG. 2 is an exploded perspective view of the fishing reel according to one embodiment of the present invention.

Referring to FIGS. 1 and 2, a fishing reel 10 according to the embodiment the present invention may include a frame 100, a spool 200 on which a fishing line is wound by rotating, a main shaft 300 for rotating the spool 200, a brake unit 400 for putting the brake on the spool 200, and a cover unit 500 disposed on the brake unit 400 so as to form an appearance of the brake unit 400.

The frame 100 may have a through hole 100b formed in a front part thereof, which allows the spool 200, the main shaft 300, and the brake unit 400 to be disposed inside of the frame 100. The spool 200, the brake unit 400, and the cover unit 500 may pass through the through hole 100b to be assembled in the frame 100 in this order. In the present disclosure, the 'front' is referred to a left, and a "rear" is referred to an opposite side thereof, that is, a right in FIGS. 1 and 2.

In this case, the spool 200 may be rotatably assembled in the frame 100 by the main shaft 300.

The frame 100 may include a mounting part 100a formed on a surface opposite to the through hole 100b by protruding therefrom to receive a bearing 110 therein.

In this case, one end of the main shaft 300 may be inserted into the mounting part 100a to be coupled thereto through the bearing 110.

More particularly, the main shaft 300 may penetrate and be inserted into the spool 200, while one end thereof is mounted in the mounting part 100a through the bearing 110.

In this case, the main shaft 300 may be fixed to the spool 200 by a fixing means such as a pin, or the like.

Accordingly, the spool 200 may rotate on the main shaft 300 inside of the frame 100 as the main shaft 300 rotates.

The brake unit 400 may be mounted on a front part of the spool 200 so as to put the brake on the spool 200. The configuration of the brake unit 400 will be described in more detail with reference to FIGS. 3 and 4.

Figure 3:
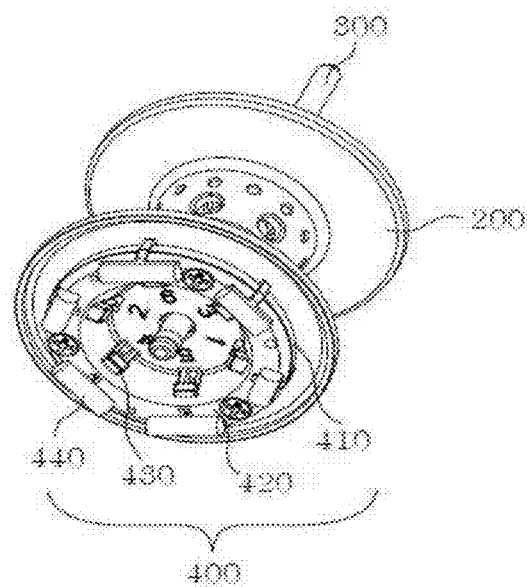
FIG. 3 is a perspective view illustrating a state in which a brake unit is coupled to a spool of the fishing reel according to one embodiment of the present invention.
Figure 4:
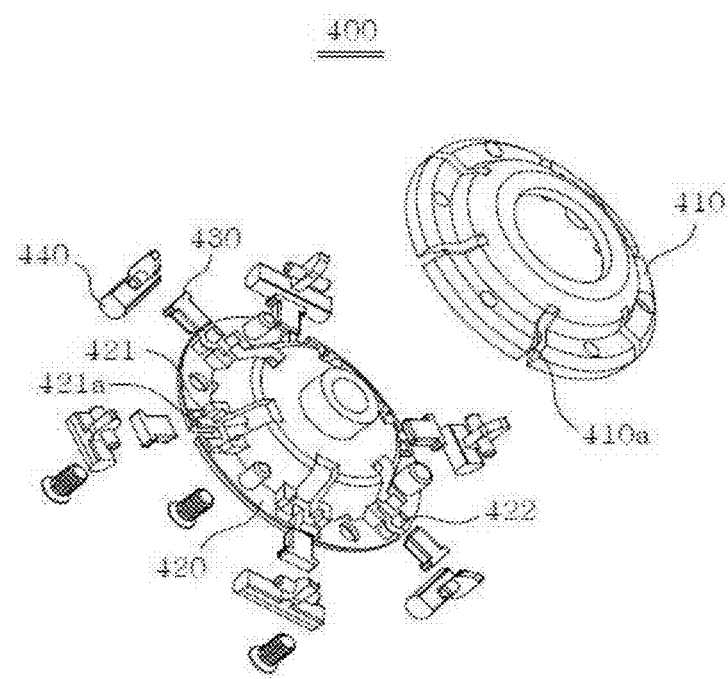
FIG. 4 is an exploded perspective view illustrating the brake unit of the fishing reel according to one embodiment of the present invention.
Figure 5:
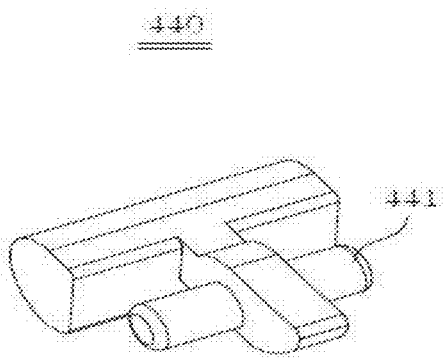
FIG. 5 is a perspective view illustrating a pivot member of the fishing reel according to one embodiment of the present invention.
Figure 6:
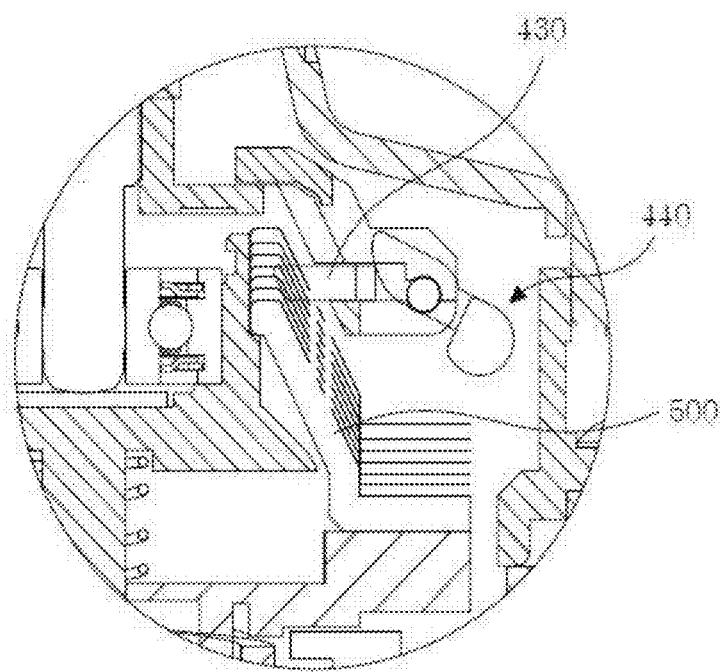
FIG. 6 is a cross-sectional view illustrating a state in which a brake shoe grasps a brake disc of the fishing reel according to one embodiment of the present invention.

FIG. 3 is a perspective view illustrating a state in which the brake unit is coupled to the spool of the fishing reel according to one embodiment of the present invention, and FIG. 4 is an exploded perspective view illustrating the brake unit of the fishing reel according to one embodiment of the present invention.

Referring to FIGS. 3 and 4, the brake unit 400 may include a retainer 410, a brake shoe housing 420, brake shoes 430 and pivot members 440.

The retainer 410 may be disposed on the front part of the above-described spool 200. More particularly, the retainer 410 may have a fixing groove formed in a rear part thereof to be engaged with a protrusion formed on the front part of the spool 200. Further, the retainer 410 may have a plurality of first guide grooves 410a radially formed in an edge portion thereof. The first guide groove 410a plays a role of guiding a lower part of the pivot member 440, when the pivot member 440 is pivoted in a radial direction of the spool 200.

The brake shoe housing 420 may be fixed to the retainer 410 by a fastening means such as bolts, or the like.

In addition, the brake shoe housing 420 may have a plurality of slots 421 formed in the rear part thereof.

More particularly, the plurality of slots 421 may be radially formed in the rear part of the 520 so as to correspond to the first guide grooves 410a.

In this case, each brake shoe 430 may be disposed in each slot 421. In addition, the brake shoes 430 may be movably installed in the slots in a horizontal direction. Therefore, the brake shoes 430 may be inserted or withdrawn into or from the slots 421 due to a horizontal force applied thereto from the pivot members 440 when the brake shoes 430 are pressed by the pivot members 440 or not pressed by the same.

More particularly, the brake shoes 430 are inserted or withdrawn into or from the slots 421 to grasp a brake disc 510 or release the same, which will be described below.

Meanwhile, each slot 421 may have a plurality of second guide grooves 421a formed by extending toward a central part of the brake shoe housing 420.

The second guide groove 421a may guide the pivot members 440, when the pivot members 440 are pivoted toward a central part of the spool 200.

Further, the brake shoe housing 420 may have a plurality of mounting grooves 422 radially formed on the edge portion thereof so as to correspond to the respective slots 421.

In this case, the pivot members 440 may be mounted on the mounting groove 422. More particularly, a pivot axis 441 formed at the lower part of the pivot member 440 may be rotatably mounted on the mounting groove 422.

Herein, the pivot axis 441 may be integrally formed with the lower part of the pivot member 440 or may be separately formed therefrom.

In the present embodiment, for the convenience of explanation, a state in which the pivot axis 441 is integrally formed with the lower part of the pivot member 440 is illustrated as an example.

The pivot members 440 may be pivoted in the radial direction of the spool 200 by a centrifugal force which is generated and applied thereto when the above-described spool 200 rotates. More particularly, the pivot members 440 may be pivoted in the radial direction of the spool 200 along the first guide grooves 410a by the centrifugal force applied thereto.

In this case, the pivot member 440 is formed such that an upper part thereof has a larger weight than the lower part thereof, based on the pivot axis 441.

The reason is that, the pivot member 440 can strongly push out the brake shoes 430 with a small force, which will be additionally described below with reference to FIGS. 7A and 7B.

Meanwhile, the lower part of the pivot member 440 may be disposed with being in contact with an upper part of the brake shoe 430.

That is, when the pivot member 440 is pivoted, the pivot member 440 may press the brake shoe 430, or do not press the same.

Again referring to FIGS. 1 and 2, the cover unit 500 may include a brake disc 510, a brake drum 520, an adjustment unit 530, and a frame cover 540.

The brake disc 510 may be disposed so as to be overlapped on the front part of the brake shoe housing 420. In addition, the brake disc 510 may have the lower part protruding therefrom.

In this case, the lower part of the brake disc 510 may be grasped by the brake shoe 430 or released by the same.

In other words, the brake shoe 430 may press the brake shoe 430 to put the brake on the spool 200.

Herein, the brake disc 510 may have a lower part formed in a taper shape.

Thereby, the brake shoe 430 may also have a lower part formed in a taper shape with an angle corresponding to the shape of the taper-shaped lower part of the brake disc 510 so that a contact surface thereof closely comes in contact therewith.

That is, the braking force of the brake shoe 430 may exert in both of vertical and horizontal directions to significantly improve the increased braking force.

The brake drum 520 may be disposed outside of the brake disc 510 to be coupled thereto so as to form an appearance of the brake disc 510.

In addition, the brake drum 520 may have a fastening groove (not illustrated) in a front part thereof. The adjustment unit 530 may be assembled in the brake drum 520 to move the brake drum 520 in a front-back direction.

More particularly, the adjustment unit 530 may include a pressing member 531, a rotating cap 532, and a knob 533.

The pressing member 531 may be inserted into the fastening groove to be assembled to the brake drum 520. In addition, the pressing member 531 may be formed in a screw shape, so as to be coupled with the rotating cap 532.

In this case, a spring S may be disposed between the rotating cap 532 and the brake drum 520.

More particularly, the rotating cap 532 may be rotatably assembled to the pressing member 531, such that the pressing member 531 may move the brake drum 520 in the front-back direction, when the rotating cap 532 rotates.

The knob 533 may be engaged to a central part of the rotating cap 532 to rotate the rotating cap 532. In other words, by adjusting the rotation of the knob 533 by a user, it is possible to grasp or release the brake drum 520 in the front-back direction.

That is, the brake disc 510 assembled with the brake drum 520 moves in the front-back direction, such that a level of grasping the brake disc 510 pressed by the brake shoe 430 may be adjusted.

The frame cover 540 may have a hole formed in a central part thereof so that the adjustment unit 530 is exposed to an outside while being disposed outside of the adjustment unit 530.

In addition, the frame cover 540 is fastened to the frame 100, such that it is possible to prevent the brake unit 400 and the spool 200 from being detached from inside of the frame 100.

Hereinafter, an operation principle of the fishing reel according to one embodiment of the present invention will be described with reference to the FIGS. 7A and 7B.

Figure 7A:
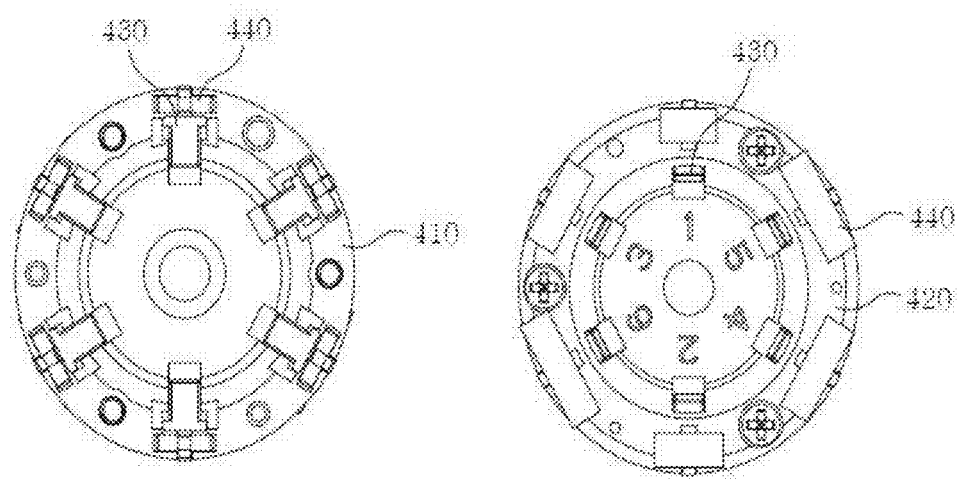
FIG. 7A is a view of a first operation state of the fishing reel according to one embodiment of the present invention.
Figure 7B:
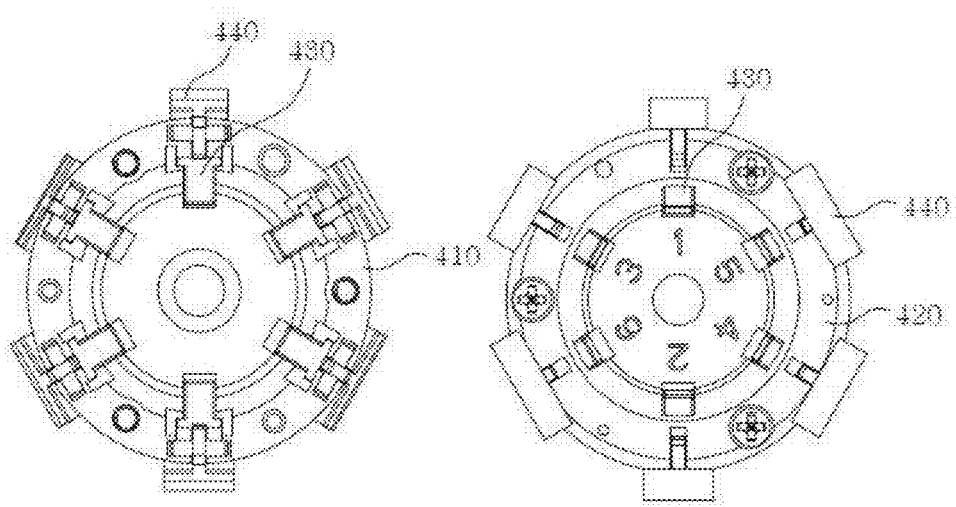
FIG. 7B is a view of a second operation state of the fishing reel according to one embodiment of the present invention.

FIG. 7A is a view of a first operation state of the fishing reel according to one embodiment of the present invention, and FIG. 7B is a view of a second operation state of the fishing reel according to one embodiment of the present invention.

Referring to FIGS. 7A and 7B, when the rotation of the spool 200 is stopped, or a speed that the fishing line is wound on the spool 200 is low, the brake shoes 430 are inserted into the slots 421, and a state in which the pivot members 440 are pivoted toward the central part of the spool 200 is maintained (see FIG. 7A).

More particularly, when the rotation of the spool 200 is stopped, or the winding speed of the fishing line on the spool 200 is low, the centrifugal force is not applied to the brake shoes 430 and the pivot members 440, thus in this state, the brake shoes 430 are maintained while releasing the brake disc 510, which is the first operation state that the brake shoe is not operated (a brake shoe non-operating (OFF) state).

On the other hand, when the spool 200 rotates at a high speed, the pivot members 440 are pivoted in the radial direction of the spool 200, such that the brake shoes 430 in contact with the lower parts of the pivot members 440 are withdrawn from the slots 421 (see FIG. 7B).

In other words, if the spool 200 rotates at a high speed, a centripetal force is applied to the lower parts of the pivot members 440 as much as a force corresponding to the centrifugal force applied to the upper parts of the pivot members 440. In this case, since the centripetal force applied to the lower parts of the pivot members 440 is larger than the centrifugal force applied to the brake shoes 430, the brake shoes 430 are pressed by the lower parts of the pivot members 440 so as to be withdrawn from the slots 421. In this state, the brake shoes 430 grasp the brake disc 510 to put the brake on the spool 200, which is the second operation state that the brake shoes are operated (a brake shoe operating (ON) state).

Meanwhile, the user may use the fishing reel by selectively locking the pivot members 440, as necessary, which will be described in detail with reference to FIG. 8A and FIG. 8B.

Figure 8A:
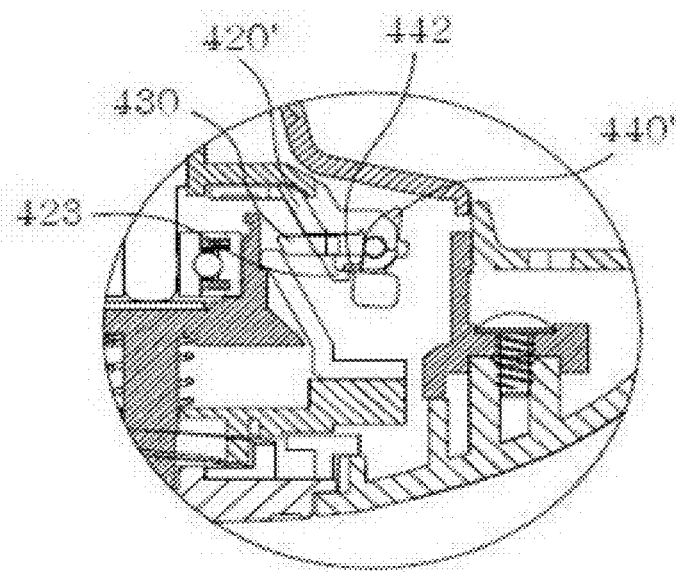
FIG. 8A is a partial cross-sectional view of the fishing reel according to another embodiment of the present invention.
Figure 8B:
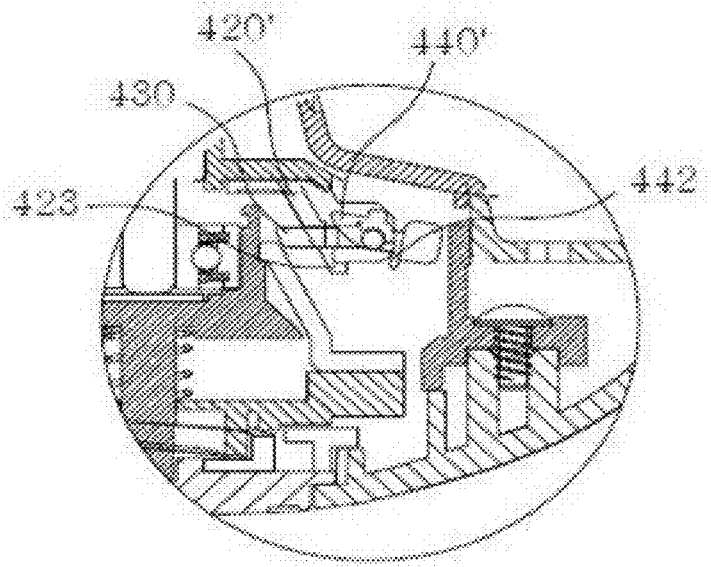
FIG. 8B is a partial cross-sectional view of the fishing reel according to another embodiment of the present invention.

FIG. 8A and FIG. 8B are partial cross-sectional views of the fishing reel according to another embodiment of the present invention.

The fishing reel according to the present embodiment includes pivot members 440' and a brake shoe housing 420' illustrated in FIG. 8A and FIG. 8B, which are formed by changing shapes of the pivot members 440 and the brake shoe housing 420 illustrated in FIGS. 1 to 7B. FIG. 8A and FIG. 8B illustrate an example in which the pivot member 440' has a protrusion part formed on the upper part thereof and the brake shoe housing 420' has a locking part 423 formed by extending a peripheral edge portion thereof, unlike the structure of the fishing reel including the pivot member 440 and the brake shoe housing 420 illustrated in FIGS. 1 to 7B. Herein, the FIG. 8A illustrates a brake shoe operating (ON) state in which the protrusion part of the upper part of the pivot member 440' is engaged to the locking part 423 which extends from the peripheral edge portion of the brake shoe housing 420' to be locked thereto, in FIG. 8B, and a brake shoe non-operating (OFF) state in FIG. 8A, respectively. According to another embodiment of the present invention, the pivot member 440' and the brake shoe housing 420' have the changed shape so as to provide a structure capable of selectively locking for the convenience of the user, as necessary.

Referring to FIG. 8A and FIG. 8B, a protrusion part 442 may be formed on the upper part of the pivot member 440' in a predetermined size. In addition, the locking part 423 may be formed on the brake shoe housing 420' in a shape in which an end thereof extends by bending.

In this case, if necessary, the user may apply a force to the pivot member 440' to be locked, so as to make the pivot member 440' be pivoted in the radial direction of the spool 200. At this time, the protrusion part 442 of the pivot member 440' is engaged to the locking part 423 of the brake shoe housing 420', and thereby the pivot member 440' is locked to the brake shoe housing 420'.

That is, since the user may selectively lock the pivot member 440', it is possible to more accurately control the braking force of the pivot member 440'.

As described above, in the fishing reel according to the embodiments of the present invention, the pivot axis 441 of the pivot members 440 and 440' plays a role of a lever, such that a strong force is applied to the upper part thereof even by a small centrifugal force, and such a strong force may strongly push out the brake shoes 430 toward the central axis to significantly improve the braking force. That is, the strong force of the pivot members 440 and 440' strongly pushes out the horizontally moving brake shoes 430, and the brake shoes 430 come into contact with the brake disc 510, thereby exerting an efficient and excellent braking force due to the friction.

In addition, each end portion of the brake disc 510 and the brake shoes 430 may be formed in a taper shape in a direction corresponding to each other. Therefore, when grasping or releasing the brake disc 510 by the brake shoes 430, a contact area therebetween is increased during grasping or leasing the same, and thereby the braking force of the brake shoes 430 may be more improved.

Further, when selectively employing the pivot members 440 and 440' having different configurations from each other depending on a necessity of the user, the pivot member 440' may be selectively locked, such that it is possible to more accurately control the braking force of the pivot member 440'.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

What is claimed is:
1. A fishing reel comprising:
a frame having a through hole formed on a front part thereof, and a mounting part formed on a surface opposite to the through hole by protruding therefrom to receive a bearing therein;

a spool which is rotatably disposed inside of the frame and has a fishing line wound thereon;

a main shaft which penetrates and is inserted into the spool, while one end thereof is mounted in the mounting part through the bearing;

a brake unit mounted on a front part of the spool to put the brake unit thereon; and a cover unit disposed on a front part of the brake unit so as to form an appearance of the brake unit, wherein the brake unit comprises:

a retainer having a fixing groove formed in a rear part thereof to be engaged with a protrusion formed on the front part of the spool, and a plurality of first guide grooves radially formed in an edge portion thereof;

a brake shoe housing which is fixed to the retainer, and has a plurality of slots formed in a rear part thereof so as to correspond to the first guide grooves, a plurality of second guide grooves formed by extending toward a central part of the brake shoe housing, and a plurality of mounting grooves radially formed on an edge portion thereof so as to correspond to the respective slots;

brake shoes which are mounted in the plurality of slots so as to be inserted into the slots or withdrawn therefrom; and pivot members which are mounted in the plurality of mounting grooves to press the brake shoes or not to press the same.

2. The fishing reel according to claim 1, wherein the cover unit comprises:

a brake disc which is disposed so as to be overlapped on a front part of the brake shoe housing, and has a lower part protruding therefrom so as to be grasped by the brake shoe or released by the same;

a brake drum which is disposed outside of the brake disc to be coupled thereto so as to form an appearance of the brake disc;

an adjustment unit which is mounted in the brake drum to move the brake drum in a front-back direction; and a frame cover which has a hole formed in a central part thereof so that the adjustment unit is exposed to an outside while being disposed outside of the adjustment unit, and is coupled to the frame, so as to prevent the brake unit and the spool from being detached from inside of the frame.

3. The fishing reel according to claim 2, wherein the adjustment unit comprises:

a pressing member mounted on a front part of the brake drum so as to press the brake drum in the front-back direction;

a rotating cap rotatably assembled to the pressing member so as to move the brake drum by the pressing member in the front-back direction during rotation thereof; and a knob which is engaged to a central part of the rotating cap to rotate the rotating cap by applying a rotation force thereto.

4. The fishing reel according to claim 2, wherein the pivot members are pivoted in a radial direction of the spool by a centrifugal force which is generated and applied thereto, when the spool rotates.

5. The fishing reel according to claim 2, wherein the pivot member includes a pivot axis which is formed at a lower part thereof and is rotatably mounted on the plurality of mounting grooves, and the pivot member is formed such that an upper part thereof has a larger weight than the lower part thereof, based on the pivot axis.

6. The fishing reel according to claim 5, wherein the pivot axis is integrally formed with the lower part of the pivot member or is separately formed therefrom.

7. The fishing reel according to claim 2, wherein pivot member is configured so that, when the spool rotates, a centripetal force is applied to the lower part thereof as much as a force corresponding to the centrifugal force applied to the upper part thereof, and the centripetal force applied to the lower part thereof is larger than the centrifugal force applied to the brake shoe.

8. The fishing reel according to claim 1, wherein the brake disc has a lower part formed in a taper shape.

9. The fishing reel according to claim 1, wherein each of the pivot members is selectively locked or unlocked to the brake shoe housing.

* * * * *